US012258024B2

(12) United States Patent
Persson et al.

(10) Patent No.: US 12,258,024 B2
(45) Date of Patent: Mar. 25, 2025

(54) DRIVER ATTENTION DETERMINATION USING GAZE DETECTION

(71) Applicant: Arriver Software AB, Linkoping (SE)

(72) Inventors: Gustav Nils Ture Persson, Ljungsbro (SE); Per Cronvall, Linkoping (SE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/822,353

(22) Filed: Aug. 25, 2022

(65) Prior Publication Data
US 2024/0067182 A1  Feb. 29, 2024

(51) Int. Cl.
*B60W 40/08* (2012.01)
*B60W 50/14* (2020.01)
*G06V 20/56* (2022.01)
*G06V 20/59* (2022.01)

(52) U.S. Cl.
CPC ............ *B60W 40/08* (2013.01); *B60W 50/14* (2013.01); *G06V 20/56* (2022.01); *G06V 20/597* (2022.01); *B60W 2050/146* (2013.01); *B60W 2420/403* (2013.01); *B60W 2540/225* (2020.02); *B60W 2540/229* (2020.02); *B60W 2556/45* (2020.02)

(58) Field of Classification Search
CPC ............... B60W 40/08; B60W 50/14; B60W 2540/225; B60W 2556/45; B60W 2540/229; B60W 2050/146; B60W 2420/42; G06V 20/597; G06V 20/56
USPC ........................................................ 340/438
See application file for complete search history.

(56) References Cited

U.S. PATENT DOCUMENTS

| | | | |
|---|---|---|---|
| 11,148,673 B2 * | 10/2021 | Dingli | B60W 50/14 |
| 2008/0186382 A1 * | 8/2008 | Tauchi | G01S 13/89 |
| | | | 342/146 |
| 2018/0026669 A1 * | 1/2018 | Edwards | G08B 21/06 |
| | | | 455/418 |
| 2018/0075309 A1 * | 3/2018 | Sathyanarayana | G05D 1/0088 |
| 2019/0236386 A1 * | 8/2019 | Yu | A61B 3/145 |
| 2019/0265712 A1 | 8/2019 | Satzoda et al. | |
| 2020/0239007 A1 * | 7/2020 | Sobhany | G05D 1/0061 |
| 2021/0174103 A1 * | 6/2021 | Schumacher | G06F 18/22 |
| 2021/0213960 A1 * | 7/2021 | Dingli | B60W 40/09 |

(Continued)

OTHER PUBLICATIONS

International Search Report and Written Opinion—PCT/EP2023/070198—ISA/EPO—Sep. 22, 2023.

*Primary Examiner* — Naomi J Small
(74) *Attorney, Agent, or Firm* — Qualcomm/Norton Rose Fulbright US LLP

(57) ABSTRACT

This disclosure provides systems, methods, and devices for vehicle driving assistance systems that support image processing for vehicular monitoring operations. In a first aspect, a method of monitoring includes receiving first image data from a first camera oriented in a first direction with a first field of view facing a user; receiving second image data from a second camera oriented in a second direction different from the first direction, the second camera having a second field of view corresponding to a field of view of the user; determining a set of regions of interest based on the second image data; determining a gaze direction of the user based on the first image data; and determining an attentiveness score based on correspondence between the set of regions of interest and the gaze direction. Other aspects and features are also claimed and described.

30 Claims, 9 Drawing Sheets

(56) References Cited

U.S. PATENT DOCUMENTS

2022/0363194 A1\* 11/2022 Windeler ............... H04N 7/181
2023/0271604 A1\* 8/2023 St. Gray ............... B60W 50/14
                                                                                                    701/26

\* cited by examiner

DRIVER ATTENTION DETERMINATION USING GAZE DETECTION

TECHNICAL FIELD

Aspects of the present disclosure relate generally to driver-operated vehicles, and more particularly, to methods and systems suitable for supplying driving assistance to a driver of a vehicle.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure, provide improved systems for assisting drivers in vehicles with enhanced situational awareness when driving on a road.

Example embodiments provide driver behavior monitoring systems and methods capable of detecting inattentive behavior by the driver, whether that inattentive behavior is the result of a distraction or untrained vehicle operation. Driver behavior analysis results may be combined with other vehicle sensor information (e.g., engine information, speed sensors, location information, etc.) to determine the occurrence and location of an accident, a near-miss of an accident, and/or score a vehicle operator's performance. The system may report an accident to authorities, emergency responders or the other drivers nearby by leveraging global positioning system (GPS) information and/or wireless multicasting techniques based on the location of the car.

In some embodiments, a system may use a map of high-risk areas in a traffic scene, in which the map provides a means to identify regions which an attentive driver should observe in order to safely navigate the traffic scene. An eye monitor may be used to log where the driver is looking. This driver data may be aggregated over time and compared with the risk map over time to determine whether the driver's gaze pattern is consistent with sufficient situation awareness. The risk map models the scene surrounding the vehicle and indicates areas of high risk, referring to areas that may represent a danger to the vehicle. High risk areas may comprise road users (e.g., bicycles, motorcycles, pedestrian walkers, etc.) that, given their position and motion, potentially constitute a risk, but also entrances, exits or edges of buildings, vegetation or other structures potentially concealing road users. The risk map may be generated by a machine learning model trained to recognize such areas in a traffic scene.

In certain embodiments, aspects of the disclosure use an image or a sequence of images from a forward-looking camera to generate the map of high-risk areas. A sensor providing depth information, such as a stereo camera or a lidar, may be used to relate the image positions to positions in the world. Images from an inward-facing camera may be used to monitor the eyes of the driver and determine the gaze direction. The attentiveness of the driver may be measured by the fraction of time spent looking at risk areas provided by the map. If this fraction drops below a certain threshold the driver may be alerted through audio-visual means, and further action may be taken if the driver's attentiveness does not improve.

In one aspect of the disclosure, a method for vehicle monitoring includes receiving first image data from a first camera oriented in a first direction with a first field of view facing a user; receiving second image data from a second camera oriented in a second direction different from the first direction, the second camera having a second field of view corresponding to a field of view of the user; determining a set of regions of interest based on the second image data; determining a gaze direction of the user based on the first image data; and determining an attentiveness score based on correspondence between the set of regions of interest and the gaze direction.

In an additional aspect of the disclosure, an apparatus includes at least one processor and a memory coupled to the at least one processor. The at least one processor is configured to perform operations including receiving first image data from a first camera oriented in a first direction with a first field of view facing a user; receiving second image data from a second camera oriented in a second direction different from the first direction, the second camera having a second field of view corresponding to a field of view of the user; determining a region of interest based on the second image data; determining a gaze direction of the user based on the first image data; and determining an attentiveness score based on correspondence between the region of interest and the gaze direction.

In an additional aspect of the disclosure, an apparatus includes means for receiving first image data from a first camera oriented in a first direction with a first field of view facing a user; means for receiving second image data from a second camera oriented in a second direction different from the first direction, the second camera having a second field of view corresponding to a field of view of the user; means for determining a region of interest based on the second image data; means for determining a gaze direction of the user based on the first image data; and means for determining an attentiveness score based on correspondence between the region of interest and the gaze direction.

In an additional aspect of the disclosure, a non-transitory computer-readable medium stores instructions that, when executed by a processor, cause the processor to perform operations. The operations include receiving first image data from a first camera oriented in a first direction with a first field of view facing a user; receiving second image data from a second camera oriented in a second direction different from the first direction, the second camera having a second field of view corresponding to a field of view of the user; determining a region of interest based on the second image data; determining a gaze direction of the user based on the first image data; and determining an attentiveness score based on correspondence between the region of interest and the gaze direction.

In an additional aspect of the disclosure, a method for vehicle monitoring includes receiving first image data from a first camera oriented in a first direction with a first field of view facing a user operating a vehicle; receiving second image data from a second camera oriented in a second direction different from the first direction, the second camera having a second field of view corresponding to a second field of view of a surrounding of the vehicle; determining a risk map based on the second image data; determining a gaze direction of the user based on the first image data; determining a correspondence between the risk map and the gaze direction; and controlling the vehicle based on the correspondence between the risk map and the gaze direction.

In an additional aspect of the disclosure, an apparatus includes at least one processor and a memory coupled to the at least one processor. The at least one processor is configured to perform operations including receiving first image data from a first camera oriented in a first direction with a first field of view facing a user operating a vehicle; receiving second image data from a second camera oriented in a second direction different from the first direction, the second camera having a second field of view corresponding to a second field of view of a surrounding of the vehicle; determining a risk map based on the second image data; determining a gaze direction of the user based on the first image data; determining a correspondence between the risk map and the gaze direction; and controlling the vehicle based on the correspondence between the risk map and the gaze direction.

In an additional aspect of the disclosure, an apparatus includes means for receiving first image data from a first camera oriented in a first direction with a first field of view facing a user operating a vehicle; means for receiving second image data from a second camera oriented in a second direction different from the first direction, the second camera having a second field of view corresponding to a second field of view of a surrounding of the vehicle; determining a risk map based on the second image data; means for determining a gaze direction of the user based on the first image data; means for determining a correspondence between the risk map and the gaze direction; and means for controlling the vehicle based on the correspondence between the risk map and the gaze direction.

In an additional aspect of the disclosure, a non-transitory computer-readable medium stores instructions that, when executed by a processor, cause the processor to perform operations. The operations include receiving first image data from a first camera oriented in a first direction with a first field of view facing a user operating a vehicle; receiving second image data from a second camera oriented in a second direction different from the first direction, the second camera having a second field of view corresponding to a second field of view of a surrounding of the vehicle; determining a risk map based on the second image data; determining a gaze direction of the user based on the first image data; determining a correspondence between the risk map and the gaze direction; and controlling the vehicle based on the correspondence between the risk map and the gaze direction.

In an additional aspect of the disclosure, a vehicular apparatus includes a vehicle frame; a first camera attached to the vehicle frame and arranged to capture a first field of view comprising a portion of a cabin enclosed on at least some sides by the vehicle frame; a second camera attached to the vehicle frame and arranged to capture a second field of view corresponding to at least a portion of surroundings of the vehicle frame; and a processing system coupled to the first camera and to the second camera. The processing system may include at least one processor and a memory coupled to the at least one processor. The at least one processor is configured to perform operations including receiving first image data from a first camera oriented in a first direction with a first field of view facing a user operating a vehicle; receiving second image data from a second camera oriented in a second direction different from the first direction, the second camera having a second field of view corresponding to a second field of view of a surrounding of the vehicle; determining a risk map based on the second image data; determining a gaze direction of the user based on the first image data; determining a correspondence between the risk map and the gaze direction; and controlling the vehicle based on the correspondence between the risk map and the gaze direction.

In an additional aspect of the disclosure, a vehicular apparatus includes a vehicle frame; a first camera attached to the vehicle frame and arranged to capture a first field of view comprising a portion of a cabin enclosed on at least some sides by the vehicle frame; a second camera attached to the vehicle frame and arranged to capture a second field of view corresponding to at least a portion of surroundings of the vehicle frame; and a processing system coupled to the first camera and to the second camera. The processing system may include at least one processor and a memory coupled to the at least one processor. The at least one processor is configured to perform operations including receiving first image data from a first camera oriented in a first direction with a first field of view facing a user; receiving second image data from a second camera oriented in a second direction different from the first direction, the second camera having a second field of view corresponding to a field of view of the user; determining a region of interest based on the second image data; determining a gaze direction of the user based on the first image data; and determining an attentiveness score based on correspondence between the region of interest and the gaze direction.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur.

Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to as (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. If just the first reference label is used in the specification, the description is applicable to any one of the similar components having the same first reference label irrespective of the second reference label.

Like reference numbers and designations in the various drawings indicate like elements.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support driver monitoring and vehicle monitoring that may be used in smart vehicles and/or automated vehicles. In particular embodiments, the vehicle may monitor and score a user's attentiveness by determining high-risk portions of the surroundings and analyzing a user's gaze direction to determine whether the user is spending sufficient time in monitoring the high-risk portions of the surroundings while driving. The vehicle may alert the driver to missed high-risk areas, control the vehicle in the absence of response from the driver, and/or report the driver's score to a remote facility.

Particular implementations of the subject matter described in this disclosure may be implemented to realize one or more of the following potential advantages or benefits. In some aspects, the present disclosure provides techniques for improving safety of drivers operating vehicle systems and a reduction of vehicle collisions that result in damage to life and property.

Figure 1:
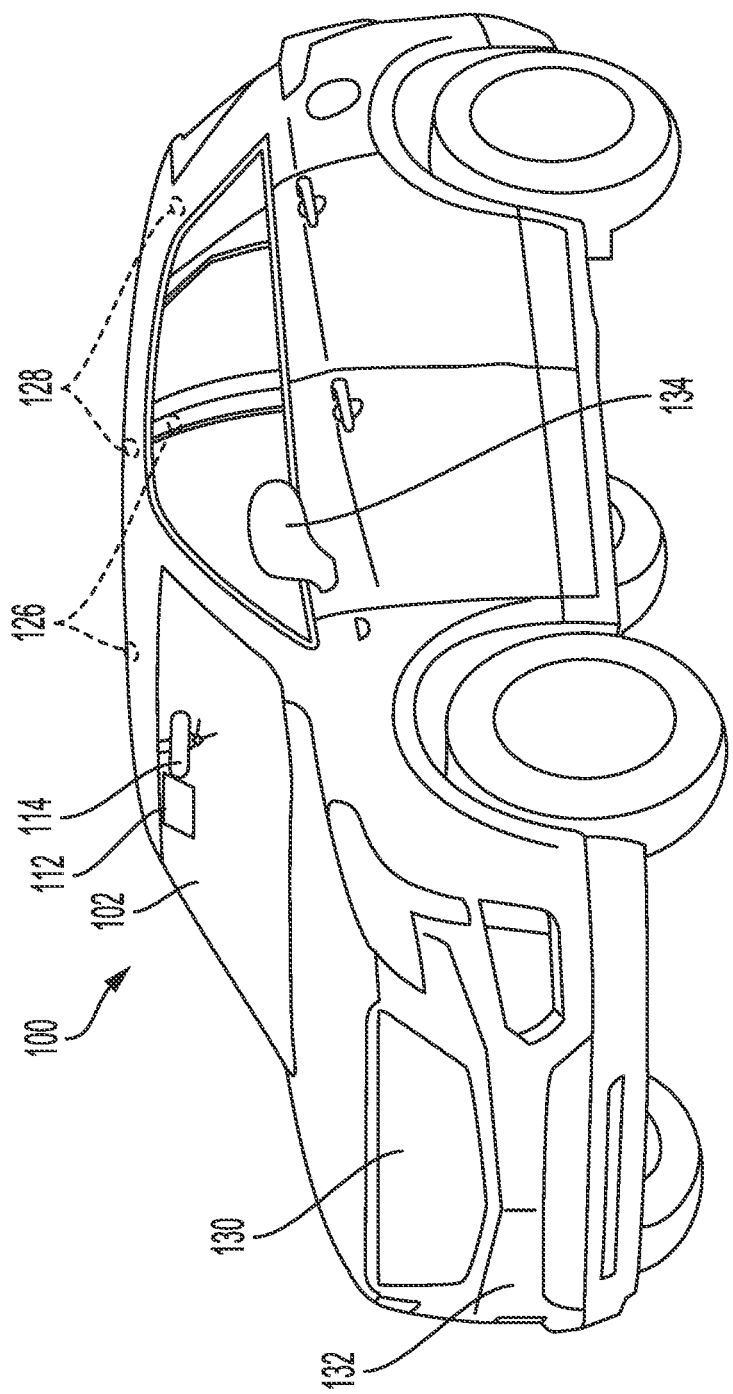
FIG. 1 is a perspective view of a motor vehicle with a driver monitoring system according to embodiments of this disclosure.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a "front-facing" camera, referring to camera 112, aspects of the disclosure may be applied similarly to a "rear-facing" camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a "front-facing" camera, referring to camera 112, aspects of the disclosure may be applied similarly to an input received from an array of cameras mounted around the vehicle 100 to provide a larger field of view, which may be as large as 360 degrees around parallel to the ground and/or as large as 180 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
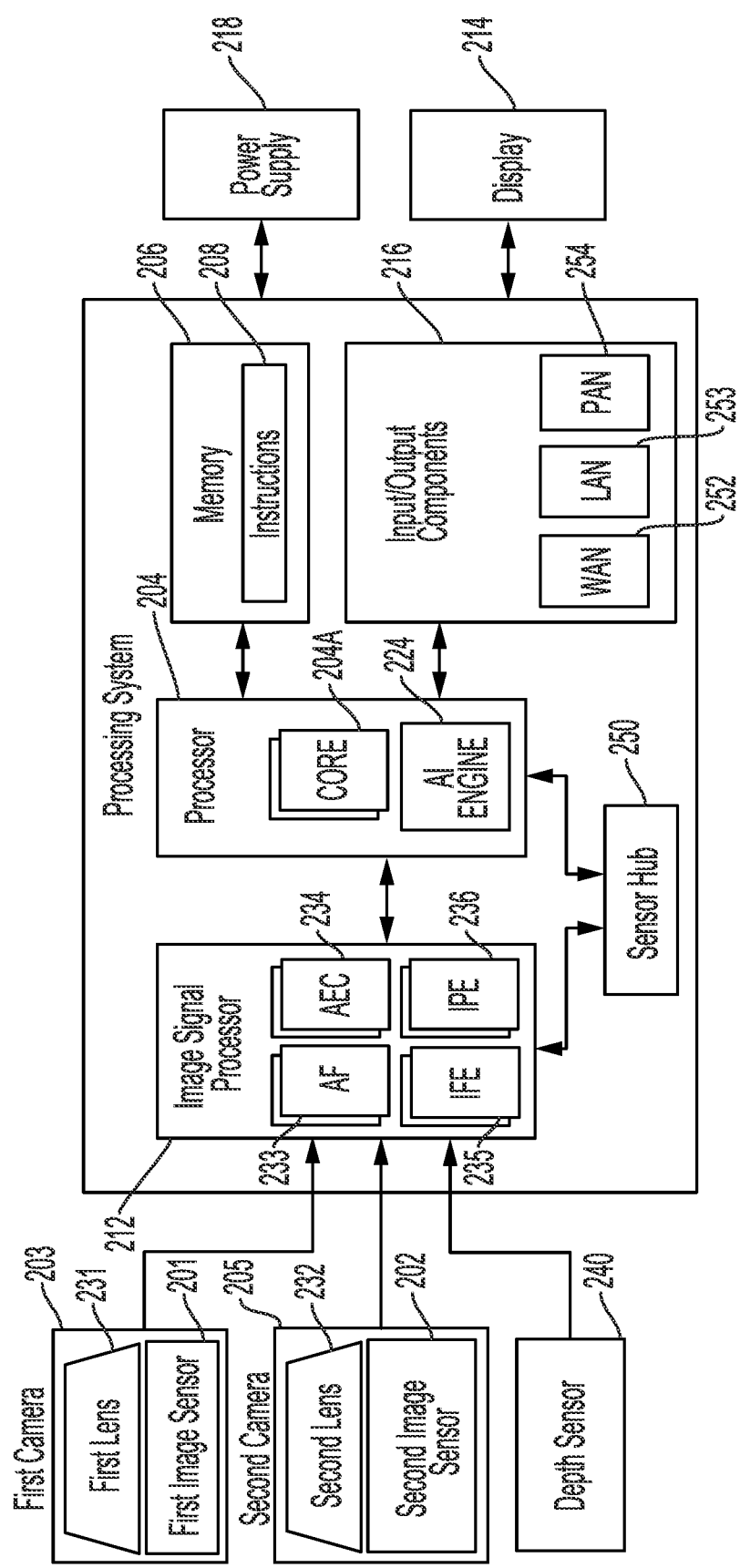
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The processing system 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The processing system 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems.

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
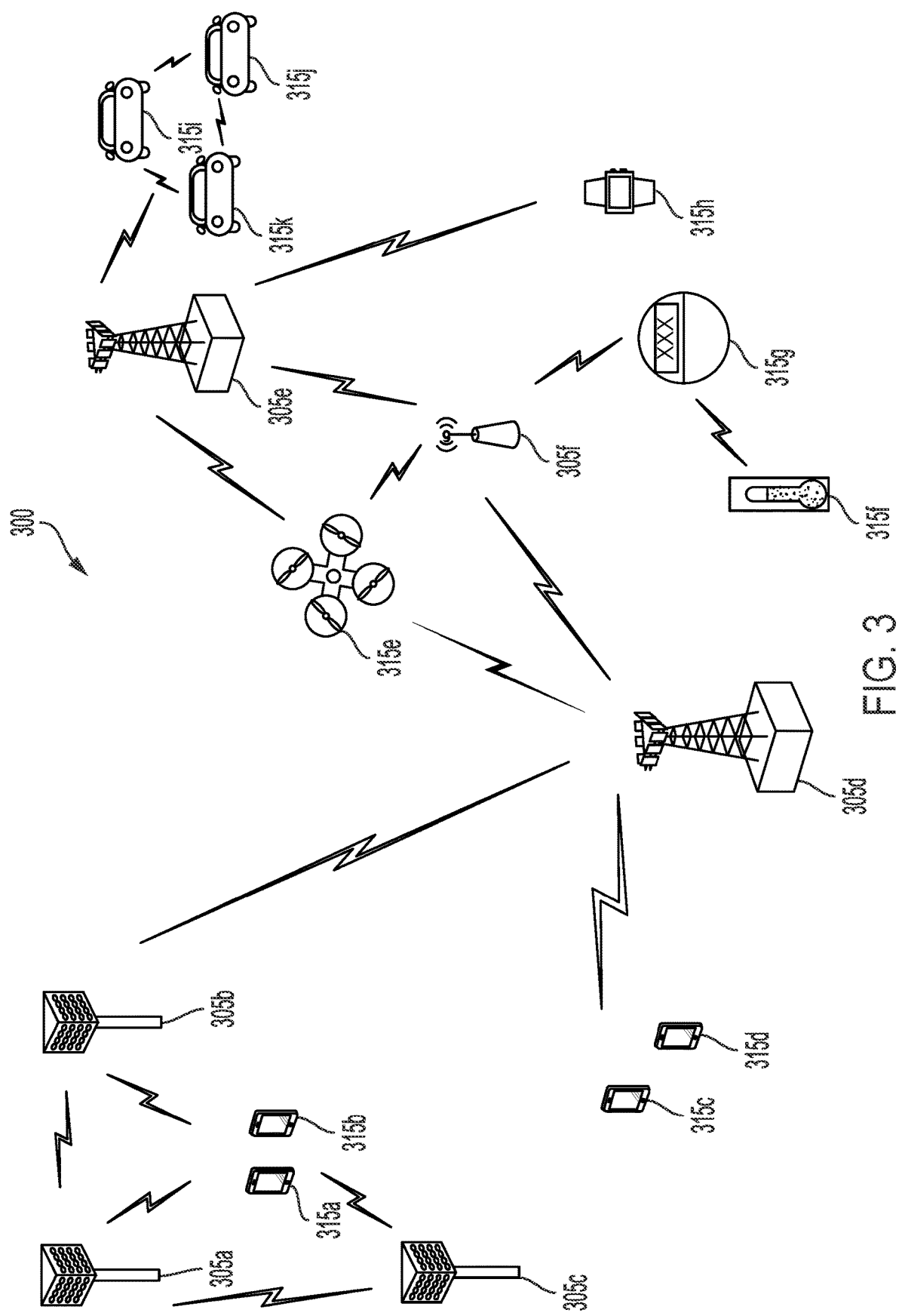
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305d and 305e are regular macro base stations, while base stations 305a-305c are macro base stations enabled with one of three-dimension (3D), full dimension (FD), or massive MIMO. Base stations 305a-305c take advantage of their higher dimension MIMO capabilities to exploit 3D beamforming in both elevation and azimuth to increase coverage and capacity. Base station 305f is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315a-j are specifically shown as vehicles, a vehicle may employ the communication configuration described with reference to any of the UEs 315a-315k.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315a-315d of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315e-315k illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305a-305c serve UEs 315a and 315b using 3D beamforming and coordinated spatial techniques, such as coordinated multipoint (CoMP) or multi-connectivity. Macro base station 305d performs backhaul communications with base stations 305a-305c, as well as small cell, base station 305f. Macro base station 305d also transmits multicast services which are subscribed to and received by UEs 315c and 315d. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315e, which is a drone. Redundant communication links with UE 315e include from macro base stations 305d and 305e, as well as small cell base station 305f. Other machine type devices, such as UE 315f (thermometer), UE 315g (smart meter), and UE 315h (wearable device) may communicate through wireless network 300 either directly with base stations, such as small cell base station 305f, and macro base station 305e, or in multi-hop configurations by communicating with another user device which relays its information to the network, such as UE 315f communicating temperature measurement information to the smart meter, UE 315g, which is then reported to the network through small cell base station 305f. Wireless network 300 may also provide additional network efficiency through dynamic, low-latency TDD communications or low-latency FDD communications, such as in a vehicle-to-vehicle (V2V) mesh network between UEs 315i-315k communicating with macro base station 305e.

Figure 4A:
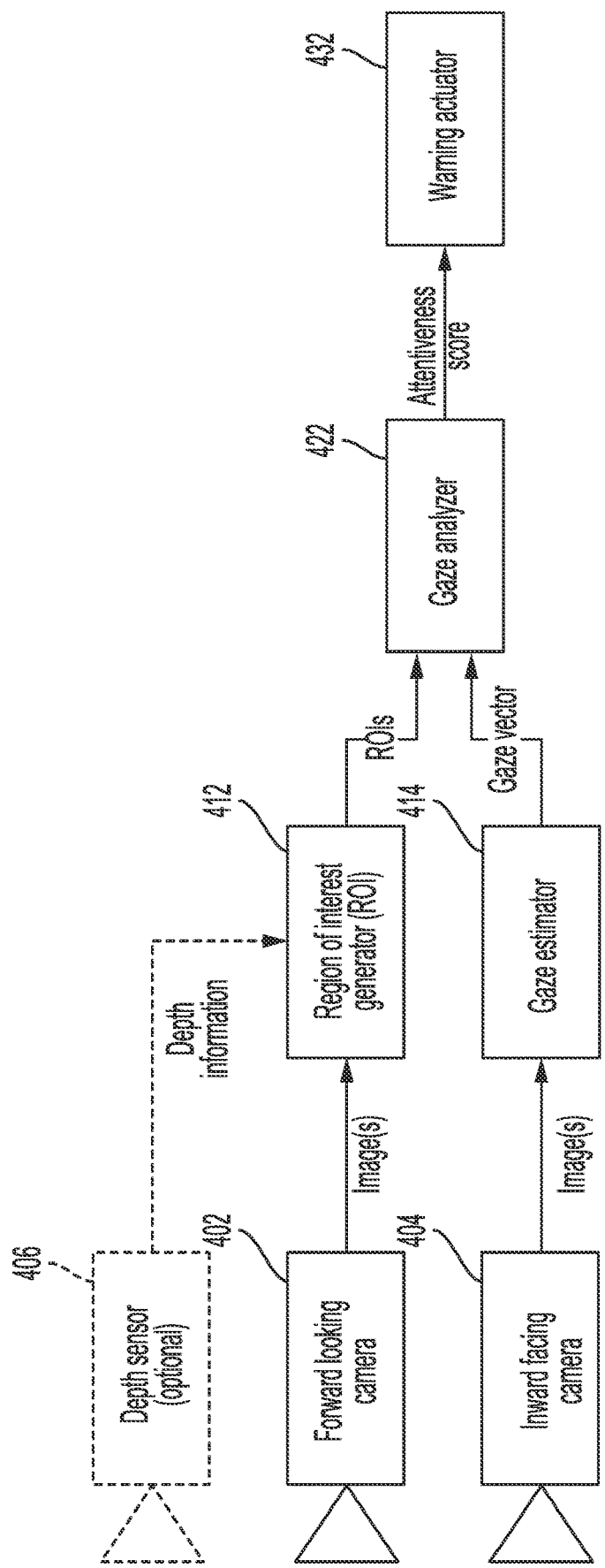
FIG. 4A is a block diagram illustrating a system for determining operator attentiveness according to one or more aspects.

Aspects of the vehicular systems described with reference to, and shown in, FIG. 1, FIG. 2, and FIG. 3 may be used to determine user operator attentiveness. For example, operator attentiveness, according to aspects of this disclosure, may be determined based on input received from the cameras 112 and 114. FIG. 4A is a block diagram illustrating a system for determining operator attentiveness according to one or more aspects of the disclosure.

A region-of-interest (ROI) generator 412 may receive input from forward-facing camera 402. The ROI generator 412 may process image frames captured by camera 402 to determine regions within the scene in a field of view of the camera 402 that captures a portion or all of the surroundings of a vehicle. The determined regions may be regions of interest because the regions should receive additional attention due to a high likelihood of a vehicle collision associated with the region. The ROI generator 412 outputs a set of regions of interest, which may be represented as a set of bounding box coordinates for the ROI. For some input scenes, there may be no region of interest such that the set is a null set, which may indicate there is no risk to assess for the operator. For example, a polygon with N number of points may be represented as N pairs of x and y coordinates corresponding to pixels within the image frame captured by camera 402. In some embodiments, the ROI may be determined based on depth information received from a depth sensor or from another depth determination system such as a dual image sensor system. For example, the depth information may be used to separate objects by distance within the field of view of the front-facing camera 402.

A gaze estimator 414 may receive input from inward-facing camera 404. The gaze estimator 414 may process image frames captured by camera 404 to determine a direction of a user operator's gaze based on, for example, a location of the operator's pupils, a shape of the operator's pupils as captured in the image frame, and/or other facial features of the operator. The gaze estimator 414 outputs a gaze direction, which may be represented as a gaze vector. For example, a three-dimensional (3D) vector may be represented by three values corresponding to a magnitude in each of the x-, y-, and z-directions of a reference vector. In some embodiments, the gaze estimator 414 may also output a head position corresponding to an x,y or x,y,z position for the operator in the cabin of the vehicle.

A gaze analyzer 422 receives the gaze vector and the set of ROIs and correlates the operator's gaze to a particular portion of the field of view of the front-facing camera 402. The gaze analyzer 422 may determine, based on the correlated gaze vector and the ROIs whether the operator has sufficiently viewed the scene in front of or around the vehicle. In some embodiments, this may involve determining whether the operator has viewed, and how much attention the operator has given to, each of the ROIs. For example, the gaze analyzer 422 may determine a dwell time that the operator's gaze direction corresponds to the ROI. If the dwell time is less than a certain threshold, the user may be determined to not be attentive enough to the ROI. In some embodiments, this may involve determining whether the operator has viewed a sufficient number of highest priority ROIs. In some embodiments, this may involve using artificial intelligence to compare the operator's behavior to the ROIs to determine whether the operator's behavior sufficiently checks the scene.

An output of the gaze analyzer 422 may be used to determine information regarding the operator, such as whether the operator is being appropriately attentive to high-risk regions in the path of the vehicle during operation of the vehicle. In some embodiments, the gaze analyzer 422 may output an attentiveness score reflecting one or more of a percentage of ROIs viewed by the operator and/or an amount of time the operator is gazing on the ROIs. The attentiveness score may indicate characteristics of the operator, such as whether the operator is drowsy or alert or whether the operator is skilled or unskilled. In some embodiments, the attentiveness score may be compared with a baseline score for the operator to separate operator skill from drowsiness.

In one example operation, an operator identification (ID) may be determined using facial recognition based on image data from the inward-facing camera 404, the operator ID may be used to look up a corresponding operator profile with an average attentiveness score, and the output of the gaze analyzer 422 compared with the average attentiveness score. The operator may be determined to be drowsy when the determined attentiveness score is below the average attentiveness score by more than a threshold amount. The operator's profile may be updated over time to reflect changing skill level of the operator by updating the average attentiveness score with the determined attentiveness score.

A warning actuator 432 may receive an output of the gaze analyzer 422 and determine an appropriate operation to be performed within the vehicle. One or more criteria may be applied against the output of the gaze analyzer 422, in which the criteria specify a condition(s) to be satisfied and an operation to execute based on matching the conditions. For example, the warning actuator 432 may determine the operator is drowsy and display an alert on a dashboard of the vehicle based on the operator's attentiveness score being below a threshold level (or a threshold below an expected value for the operator). As another example, the warning actuator 432 may control vehicle operations based on criteria, such as applying a speed limiter to the vehicle or initiating a safe-stop procedure when the operator is determined to be inattentive.

The warning actuator 432 may receive additional information from the gaze analyzer 422, such as ROIs to which the operator is not or did not provide sufficient attention. For example, the gaze analyzer 422 may output an identifier of the ROI determined by ROI generator 412, provide identifying information such as x,y coordinates for a ROI, and/or provide a marked-up version of the image frame captured by forward-facing camera 402 to annotate the missed ROI in the captured scene. The warning actuator 432 may output information to the operator indicating a missed ROI. In some embodiments, the warning actuator 432 may maintain a count of missed ROIs, and when the number of missed ROIs exceeds a threshold number within a certain time period the operator may be instructed to take a break and/or the vehicle controlled to enforce a break by disabling vehicle propulsion.

The warning actuator 432 may provide feedback to the user in addition to or in the alternative to a display output. For example, the warning actuator 432 may communicate with a haptic device in the operator's seat to activate vibration to provide tactile stimulation to the operator to make the operator more attentive. In some embodiments, when the vehicle approaches a threshold distance of an ROI without the user gazing at the ROI the operator's chair may vibrate to alert the operator to a potential danger. In some embodiments, a display in the cabin may also display an image of the scene around the car with the missed ROI highlighted in connection with the haptic feedback to draw the operator's attention to a particular ROT. In some embodiments, the haptic device may be part of a mobile device carried by the operator in their pocket with the warning actuator 432 interfacing with the mobile device through a wireless interface such as PAN adaptor 254. In some embodiments, a heads-up display (HUD) may draw the operator's attention towards the missed ROI or otherwise where the operator's attention should be focused.

The warning actuator 432 may also communicate with other devices over a wireless communication system, such as that illustrated in FIG. 3. For example, the warning actuator 432 may transmit the operator's attentiveness score and/or other information described with reference to FIG. 4 (including image data, ROI data, gaze vectors, marked-up image frames, etc.) to a remote monitoring station, a user device, a nearby vehicle, and/or other UEs.

Figure 4B:
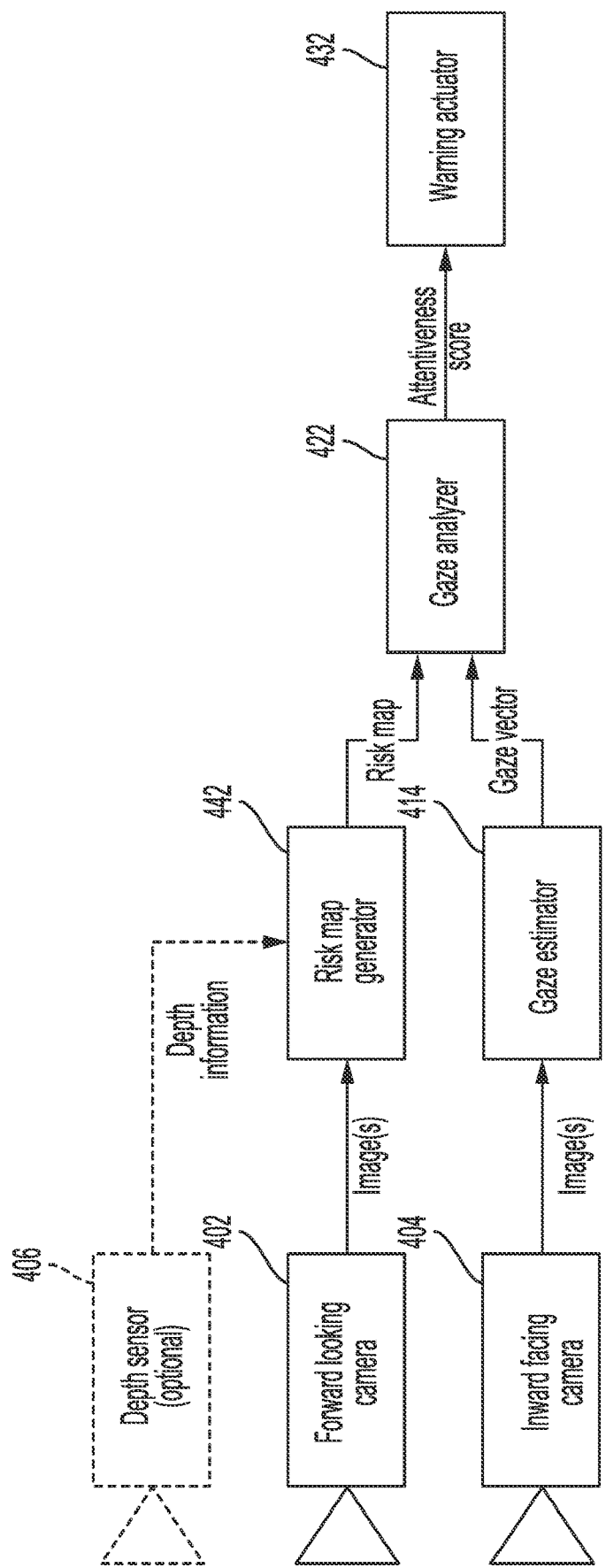
FIG. 4B is a block diagram illustrating a system for determining operator attentiveness according to one or more aspects of the disclosure.

In another embodiment, the gaze analyzer 422 may operate directly on the risk map as shown in FIG. 4B. FIG. 4B is a block diagram illustrating a system for determining operator attentiveness according to one or more aspects of the disclosure. The gaze analyzer 422 receives a risk map output by risk map generator 442, and compares the gaze vector to the risk map to determine an outcome of a set of criteria reflected in an attentiveness score. In an embodiment within the example of FIG. 4B, the gaze analyzer 422 may correlate the gaze direction directly with the probability distribution represented by a risk map.

Figure 5:
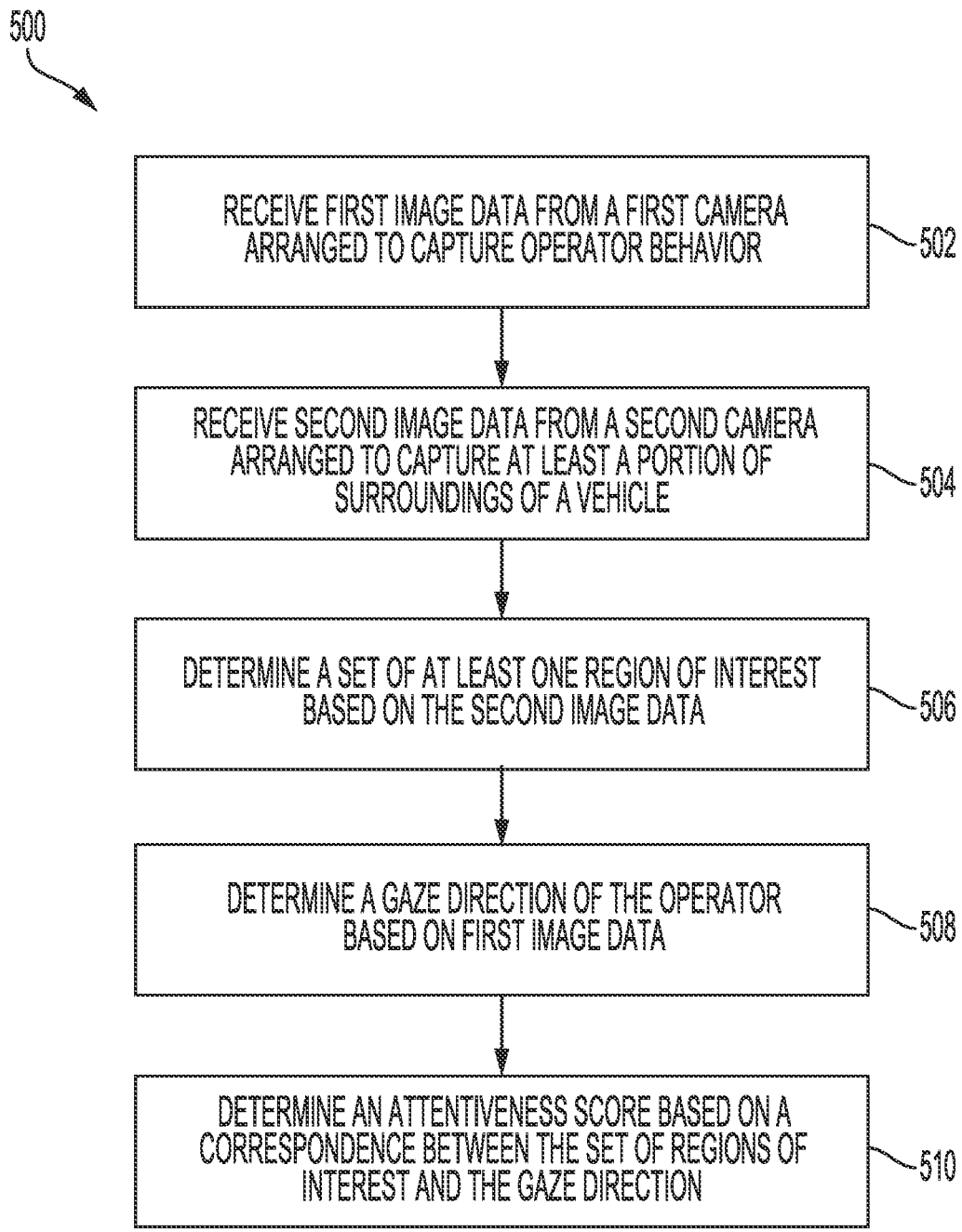
FIG. 5 is a flow diagram illustrating an example process that performs image processing in support of a vehicular monitoring operation according to one or more aspects.

FIG. 5 is a flow diagram illustrating an example process 500 that performs image processing in support of a vehicular monitoring operation according to one or more aspects. Operations of process 500 may be performed by a UE, such as a vehicle UE described above with reference to FIG. 3 or FIG. 4. For example, example operations (also referred to as "blocks") of process 500 may enable vehicle UE to support image processing and vehicle monitoring operations.

In block 502, first image data from a first camera is received, the first image data representing a scene that includes the vehicle operator behavior. The first camera may be arranged to capture such first image data by being attached to a vehicle frame and pointing in a direction towards the driver seat. In some embodiments, the first camera may be configured to track a face of the operator to improve the reliability of gaze determinations made from the first image data.

In block 504, second image data from a second camera is received, the second image data representing a scene that includes at least a portion of surroundings of the vehicle. The second camera may be arranged to capture such second image data by being attached to the vehicle frame and pointing in a direction away from the vehicle, which may be a different direction that the direction that the first camera is pointing. The second camera may be attached to the vehicle frame, for example, by attachment to a radiator grill, to a bumper, to a door, to a side-view mirror, to a hood, to a ceiling, to a wheel, to a windshield, or to an A, B, or C pillar.

In block 506, a set of regions of interest is determined based on the second image data. A region of interest may reflect a region of the surroundings that is a high-risk area for operating the vehicle. An example high-risk area is a blocked view area, such as a parked vehicle or a blind corner, because an object may appear from behind the blocked view area without warning. An operator should be cautious of such high-risk areas and be actively checking the high-risk areas.

In block 508, a gaze direction of the operator is determined based on the first image data. The first image may be analyzed to detect a face, identify eye portions of the face, and then determine a gaze direction based on the eye portions. For example, the eye portions of the image data may be adjusted for an angle of view from the camera such that the angle of the pupils with reference to the surroundings of the vehicle may be determined.

In block 510, the gaze direction may be compared with the regions of interest to determine an attentiveness score. In some embodiments, the attentiveness score may be a binary value (e.g., yes or no) indicating whether the operator has checked the region of interest for a sufficient amount of time (e.g., total dwell time of all gazing or number of times the gaze direction returns to the region of interest) to safely pass through the high-risk region. In some embodiments, the attentiveness score may be a scaled value from 1 to 10 or 1 to 100 indicating an attentiveness rating based on the correspondence between the gaze direction and regions of interest determined over a period of time.

In certain embodiments, rules specifying criteria and outcomes may be applied to the attentiveness score. For example, a criterion may be that the attentiveness core is below a threshold level and the outcome may be to perform an action to alert the operator of their attentiveness score. The processing system may also take other action in the vehicle to reduce the consequences of low attentiveness or to improve the operator's attentiveness. For example, the processing system may begin to reduce the vehicle speed, place a limit on the vehicle speed, or prohibit propulsion of the vehicle. As another example, the processing system may flash interior lights and/or provide haptic feedback to the operator to increase the operator's alertness.

In certain embodiments, the rules may provide escalating response to operator inattentiveness, such as by increasing the severity of actions if less severe actions are not successful for improving attentiveness. For example, an initial warning may be presented on the dashboard, which if unsuccessful, may result in application of haptic feedback, which if unsuccessful, may result in applying brakes to stop the vehicle. The escalation of events may be ended when the operator's gaze is detected toward the region of interest.

In certain embodiments, the attentiveness score may be transmitted through a wireless communication network such as shown in FIG. 3. The transmitted score may be used, for example, to record a history of the operator's driving behavior. The transmitted score may be used, for example, to warn nearby pedestrians through communication to the UE of the inattentive operator, to warn nearby officials through communication to the police's UE of the inattentive operator, and/or to warn nearby vehicles of the inattentive operator such that other operators may consider the vehicle to be a high-risk region of interest.

Figure 6A:
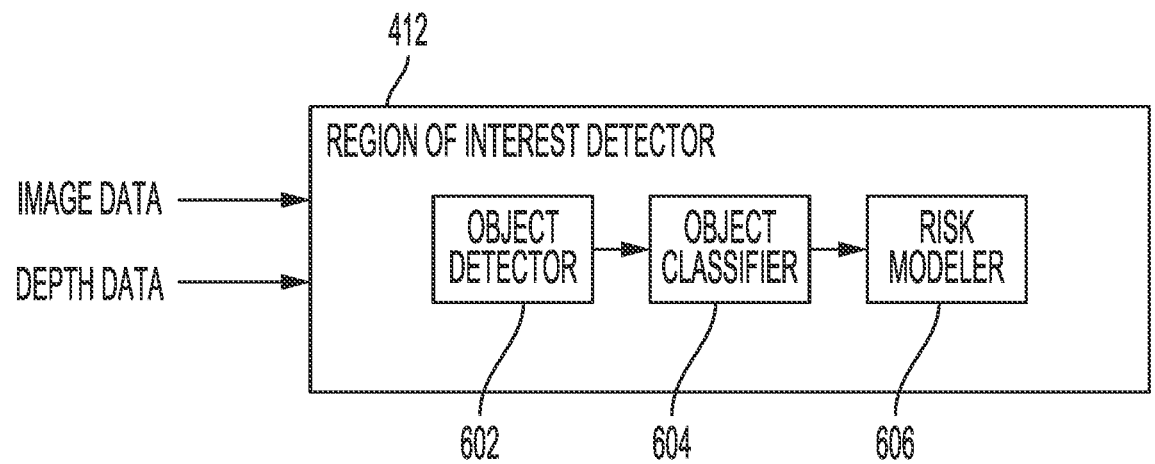
FIG. 6A is a block diagram illustrating a region of interest generator using an object detector according to one or more aspects.
Figure 6B:
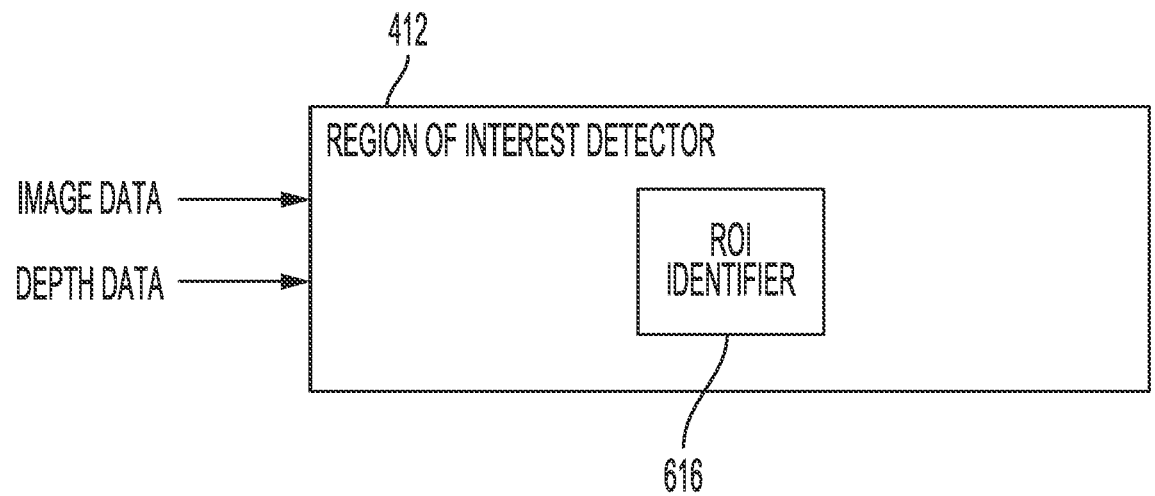
FIG. 6B is a block diagram illustrating a region of interest generator using a risk map according to one or more aspects.

Example techniques for determining a region of interest as described in block 506 are shown in FIG. 6A and FIG. 6B. FIG. 6A is a block diagram illustrating a region of interest generator using an object detector according to one or more aspects. In ROI detector 412 of FIG. 6A, an object detector 602 may receive image data and/or depth data to detect objects in the surroundings of the vehicle. The objects may be provided to an object classifier 604, which classifies the objects into categories such as car, person, trash can, bicycle, animal, etc. The list of objects detected by detector 602 and their classification determined by classifier 604 may be provided to risk modeler 606. Risk modeler 606 may determine from the object's location in the surroundings and classification whether the object or the vicinity of the object represents a risk to the vehicle. Regions of the surroundings may be identified as regions of interest and output from the ROI detector by the risk modeler 606. The ROI output may be a set of coordinates specifying a polygon in an image frame of the image data, such as a rectangle, that encloses an area of the image frame to indicate a high-risk area. The ROI output may alternatively be a single point in the image frame.

A region of interest may also be determined using a risk map, which is a two-dimensional or three-dimensional data structure of values representing surroundings of the vehicle and perceived risk to vehicle operation at various positions in the surroundings. FIG. 6B is a block diagram illustrating a region of interest generator using a risk map according to one or more aspects. A machine learning model may be trained offline and deployed in the vehicle as a risk map generator, such as within the ROI identifier 616, which, during the operation of the vehicle by the operator, may generate a risk map based on one or more of image data, depth data, and vehicle state. The trained model may be generated from data collected from vehicles during operation, which may include image data, depth data, and/or other sensor data.

The risk map may be used by ROI identifier 616 to determine regions of interest from the risk map that the operator should be monitoring for safety reasons.

Although depth data is described as an optional input to the ROI detector 412 for detecting objects in FIG. 6A or determining a risk map in FIG. 6B, other or additional data may be used in place of or in addition to the image data or depth data. For example, the ROI detector 412 may use input from one or more sensors of different modalities, e.g., cameras, radars, or lidars. In certain embodiments, the ROI detector 412 may use data obtained from the cloud or other vehicles in the vicinity.

Figure 7:
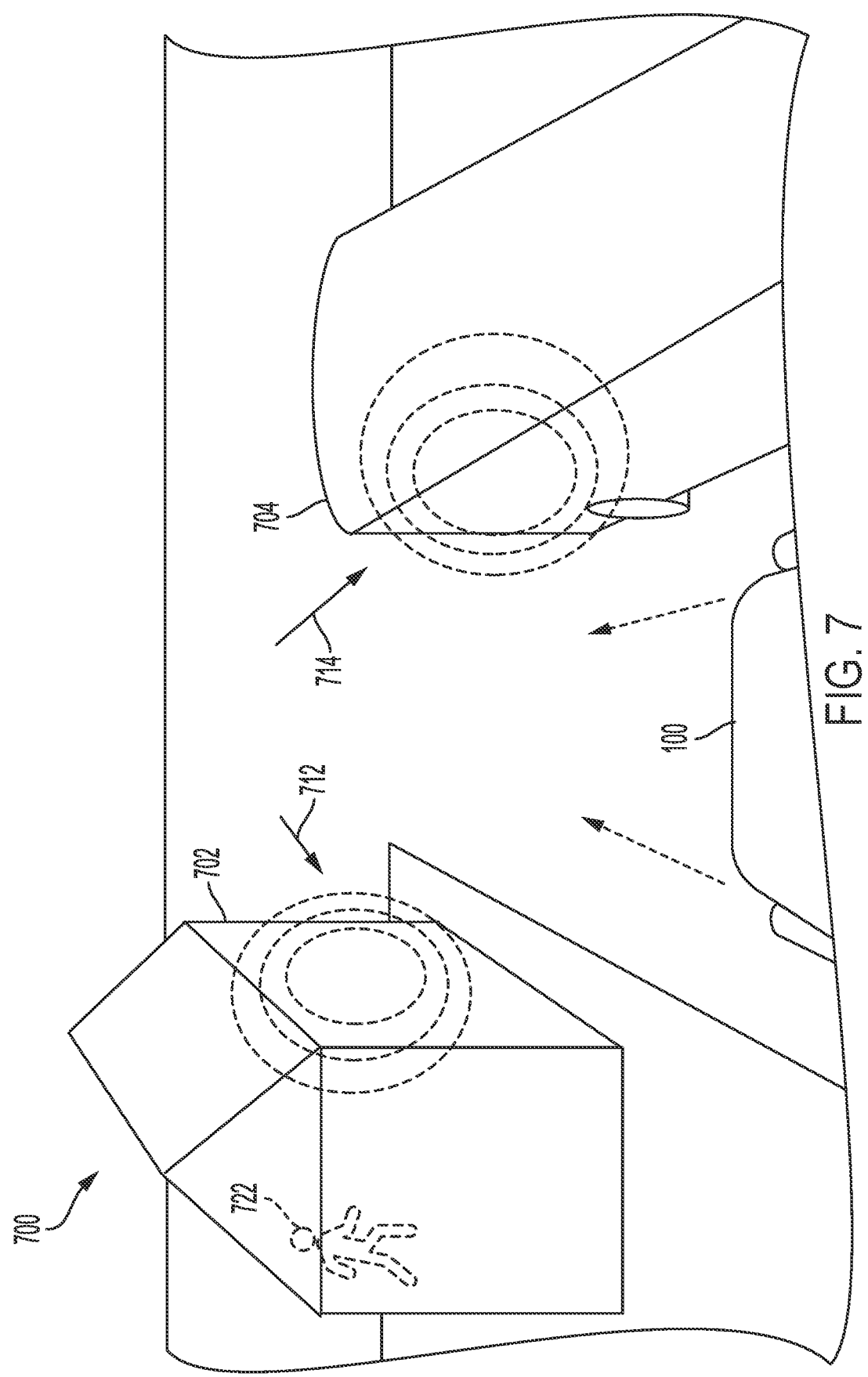
FIG. 7 is an illustration of a scene with high-risk regions that may be reflected in a risk map according to one or more aspects.

Example high-risk regions of interests to be detected by the ROI detector 412 are shown in FIG. 7. FIG. 7 is an illustration of a scene with high-risk regions that may be reflected in a risk map according to one or more aspects. A vehicle 100 driving down a street may have an obstructed view due to stationary object 702 and/or moving object 704. Each of the objects 702 and 704 may thus create regions of interest 712 and 714, respectively, to which an operator of the vehicle 100 should approach cautiously. For example, the operator should visually inspect the areas in the regions of interest 712 and 714 more frequently than other areas and/or approach the street areas corresponding to the regions of interest 712 and 714 slowly due to the possibility of an unseen pedestrian 722 crossing out in front of the vehicle 100. If the user does not gaze in the direction of regions of interest 712 and 714, the vehicle 100 may alert the user or take action to slow the vehicle 100 as the vehicle 100 approaches the regions of interest 712 and 714, and then allow the vehicle to return to normal speed after passing the regions of interest 712 and 714.

Figure 8:
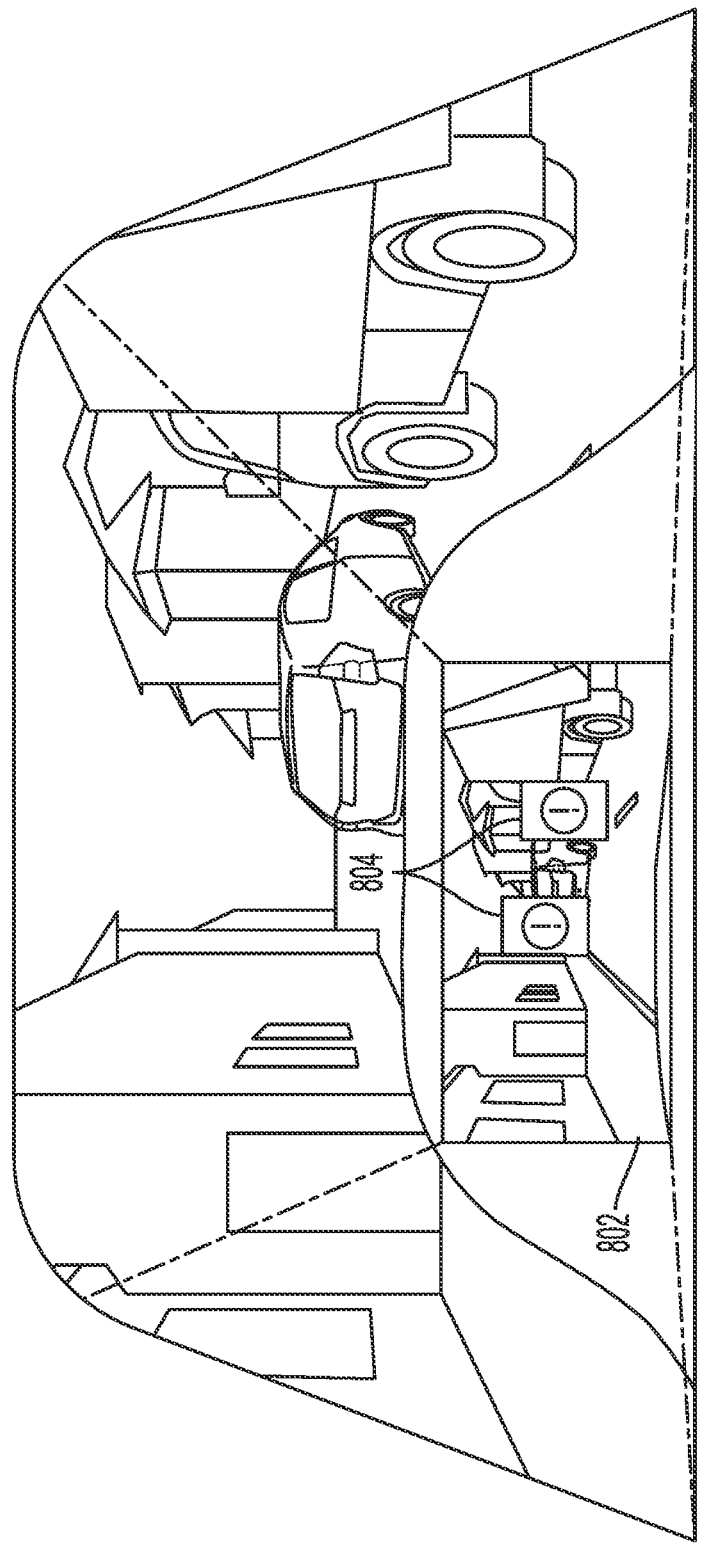
FIG. 8 is an illustration of a vehicular display showing an alertness alert according to one or more aspects.

One example of such an operator alert is shown in FIG. 8. FIG. 8 is an illustration of a vehicular display showing an alertness alert according to one or more aspects. An operator of the vehicle 100 may have view of a display 802 on a dashboard of the vehicle. The dashboard, or other display such as a heads-up display (HUD), of the vehicle 100 may display a representation of the vehicle surroundings, such as the image data from the front-facing camera and/or the generated scene model of the surroundings. The vehicle may display alerts 804 corresponding to the regions of interest that have been detected but that the operator has not sufficiently examined. The alerts 804 may grow in urgency as the vehicle 100 approaches the corresponding regions of interest, such as by changing color and/or blinking and/or increasing in intensity. The alerts 804 may be cleared when the operator sufficiently gazes in the direction of the corresponding region of interest.

It is noted that one or more blocks (or operations) described with reference to FIG. 5 may be combined with one or more blocks (or operations) described with reference to another of the figures. For example, one or more blocks (or operations) of FIG. 5 may be combined with one or more blocks (or operations) of FIG. 3. As another example, one or more blocks associated with FIG. 5 may be combined with one or more blocks associated with FIG. 2. As another example, one or more blocks associated with FIG. 5 may be combined with one or more blocks (or operations) associated with FIGS. 6-8. Additionally, or alternatively, one or more operations described above with reference to FIGS. 1-3 may be combined with one or more operations described with reference to FIGS. 4-8.

In one or more aspects, techniques for supporting vehicular operations may include additional aspects, such as any single aspect or any combination of aspects described below or in connection with one or more other processes or devices described elsewhere herein. In a first aspect, supporting image processing, such as for vehicular monitoring operations, may include an apparatus comprising one or more of a vehicle frame; a first camera attached to the vehicle frame and arranged to capture a first field of view comprising a portion of a cabin enclosed on at least some sides by the vehicle frame; a second camera attached to the vehicle frame and arranged to capture a second field of view corresponding to at least a portion of surroundings of the vehicle frame; and a processing system coupled to the first camera and to the second camera. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, a processing system of the apparatus is configured to perform operations including receiving first image data from a first camera oriented in a first direction with a first field of view facing a user; receiving second image data from a second camera oriented in a second direction different from the first direction, the second camera having a second field of view corresponding to a field of view of the user; determining a region of interest based on the second image data; determining a gaze direction of the user based on the first image data; and determining an attentiveness score based on correspondence between the region of interest and the gaze direction.

In a third aspect, in combination with one or more of the first aspect or the second aspect, the first image data comprises a first plurality of image frames captured over a duration of time, and wherein the second image data comprises a second plurality of image frames captured over the duration of time.

In a fourth aspect, in combination with one or more of the first aspect through the third aspect, determining the attentiveness score comprises determining a fraction of the duration of time that the gaze direction of the user is correlated with the region of interest.

In a fifth aspect, in combination with one or more of the first aspect through the fourth aspect, determining the region of interest comprises: determining a risk map based on the second image data, wherein the region of interest corresponds to a portion of the risk map above a threshold risk level.

In a sixth aspect, in combination with one or more of the first aspect through the fifth aspect, determining the risk map comprises determining a risk associated with a scene model using a machine learning (ML) algorithm.

In a seventh aspect, in combination with one or more of the first aspect through the sixth aspect, determining the region of interest comprises: determining an object of interest in the second image data based on object detection, wherein the region of interest corresponds to the object of interest.

In an eighth aspect, in combination with one or more of the first aspect through the seventh aspect, the apparatus is also configured to perform operations including determining whether the attentiveness score meets a first criteria; and when the attentiveness score meets the first criteria, performing an action to alert the user.

In a ninth aspect, in combination with one or more of the first aspect through the eighth aspect, determining whether the attentiveness score meets a first criteria comprises determining whether the attentiveness score is a predetermined threshold amount below a historical attentiveness score corresponding to the user.

In a tenth aspect, in combination with one or more of the first aspect through the ninth aspect, performing the action to alert the user comprises displaying the second image data on a user display with the region of interest marked on the second image data.

In an eleventh aspect, in combination with one or more of the first aspect through the tenth aspect, the apparatus is also configured to perform operations including transmitting the attentiveness score through a wireless communication link.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method, comprising:
   receiving first image data from a first camera oriented in a first direction with a first field of view facing a user;
   receiving second image data from a second camera oriented in a second direction different from the first direction, the second camera having a second field of view corresponding to a field of view of the user;
   determining a set of regions of interest based on the second image data;
   determining a gaze direction of the user based on the first image data; and
   determining an attentiveness score based on correspondence between the set of regions of interest and the gaze direction, the attentiveness score indicating whether the gaze direction of the user corresponds to the set of regions of interest for at least a threshold amount of
   time, wherein determining the attentiveness score further comprises determining missed regions of interest among the set of regions of interest, each of the missed regions of interest indicating a region of interest to which the gaze direction of the user does not correspond for at least a threshold amount of time; and
   performing an action to alert the user in response to the missed regions of interest being higher than a threshold number.

2. The method of claim 1, wherein the first image data comprises a first plurality of image frames captured over a duration of time, and wherein the second image data comprises a second plurality of image frames captured over the duration of time.

3. The method of claim 2, wherein determining the attentiveness score comprises determining a fraction of the duration of time that the gaze direction of the user is correlated with the set of regions of interest.

4. The method of claim 1, wherein determining the set of regions of interest comprises:
   determining a risk map based on the second image data, wherein the set of regions of interest corresponds to portions of the risk map above a threshold risk level.

5. The method of claim 4, wherein determining the risk map comprises determining the risk map using a machine learning (ML) algorithm.

6. The method of claim 1, wherein determining the set of regions of interest comprises:
   determining an object of interest in the second image data based on object detection, wherein the region of interest corresponds to the object of interest.

7. The method of claim 1, further comprising:
   determining whether the attentiveness score meets a first set of criteria; and
   performing an action to alert the user when the attentiveness score meets the first set of criteria.

8. The method of claim 7, wherein determining whether the attentiveness score meets a first set of criteria comprises determining whether the attentiveness score is a predetermined threshold amount below a historical attentiveness score corresponding to the user.

9. The method of claim 7, wherein performing the action to alert the user comprises displaying the set of regions of interest on a heads-up display (HUD).

10. The method of claim 1, further comprising transmitting the attentiveness score through a wireless communication link.

11. An apparatus, comprising:
    a memory storing processor-readable code; and
    at least one processor coupled to the memory, the at least one processor configured to execute the processor-readable code to cause the at least one processor to perform operations including:
    receiving first image data from a first camera oriented in a first direction with a first field of view facing a user;
    receiving second image data from a second camera oriented in a second direction different from the first direction, the second camera having a second field of view corresponding to a field of view of the user;

determining a set of regions of interest based on the second image data;

determining a gaze direction of the user based on the first image data; and determining an attentiveness score based on correspondence between the set of regions of interest and the gaze direction, the attentiveness score indicating whether the gaze direction of the user corresponds to the set of regions of interest for at least a threshold amount of time, wherein determining the attentiveness score further comprises determining missed regions of interest among the set of regions of interest, each of the missed regions of interest indicating a region of interest to which the gaze direction of the user does not correspond for at least a threshold amount of time; and performing an action to alert the user in response to the missed regions of interest being higher than a threshold number.

12. The apparatus of claim 11, wherein the first image data comprises a first plurality of image frames captured over a duration of time, and wherein the second image data comprises a second plurality of image frames captured over the duration of time.

13. The apparatus of claim 12, wherein determining the attentiveness score comprises determining a fraction of the duration of time that the gaze direction of the user is correlated with the set of regions of interest.

14. The apparatus of claim 11, wherein determining the set of regions of interest comprises:

determining a risk map based on the second image data, wherein the set of regions of interest corresponds to portions of the risk map above a threshold risk level.

15. The apparatus of claim 14, wherein determining the risk map comprises determining the risk map using a machine learning (ML) algorithm.

16. The apparatus of claim 11, wherein determining the set of regions of interest comprises:

determining an object of interest in the second image data based on object detection, wherein the region of interest corresponds to the object of interest.

17. The apparatus of claim 11, wherein the at least one processor is further configured to execute the processor-readable code to cause the at least one processor to perform operations including:

determining whether the attentiveness score meets a first set of criteria; and when the attentiveness score meets the first set of criteria, performing an action to alert the user.

18. The apparatus of claim 17, wherein determining whether the attentiveness score meets a first set of criteria comprises determining whether the attentiveness score is a predetermined threshold amount below a historical attentiveness score corresponding to the user.

19. The apparatus of claim 17, wherein performing the action to alert the user comprises displaying the set of regions of interest on a heads-up display (HUD).

20. The apparatus of claim 11, wherein the at least one processor is further configured to execute the processor-readable code to cause the at least one processor to perform operations including:

transmitting the attentiveness score through a wireless communication link.

21. A vehicular apparatus, comprising: a vehicle frame; a first camera attached to the vehicle frame and arranged to capture a first field of view comprising a portion of a cabin enclosed on at least some sides by the vehicle frame; a second camera attached to the vehicle frame and arranged to capture a second field of view corresponding to at least a portion of surroundings of the vehicle frame; and a processing system coupled to the first camera and to the second camera, wherein the processing system comprises: a memory storing processor-readable code; and at least one processor coupled to the memory, the at least one processor configured to execute the processor-readable code to cause the at least one processor to perform operations including: receiving first image data from the first camera; receiving second image data from the second camera; determining a set of regions of interest based on the second image data; determining a gaze direction of a user based on the first image data; and determining an attentiveness score based on correspondence between the set of regions of interest and the gaze direction, the attentiveness score indicating whether the gaze direction of the user corresponds to the set of regions of interest for at least a threshold amount of time, wherein determining the attentiveness score further comprises determining missed regions of interest among the set of regions of interest, each of the missed regions of interest indicating a region of interest to which the gaze direction of the user does not correspond for at least a threshold amount of time; and performing an action to alert the user in response to the missed regions of interest being higher than a threshold number.

22. The vehicular apparatus of claim 21, wherein:

the first image data comprises a first plurality of image frames captured over a duration of time, the second image data comprises a second plurality of image frames captured over the duration of time, and determining the attentiveness score comprises determining a fraction of the duration of time that the gaze direction of the user is correlated with the set of regions of interest.

23. The vehicular apparatus of claim 21, wherein:

determining the set of regions of interest comprises determining a risk map based on the second image data, the set of regions of interest corresponding to portions of the risk map above a threshold risk level; and the operations further include one or more operations of:

determining whether the attentiveness score meets a first set of criteria; and when the attentiveness score meets the first set of criteria, performing an action to alert the user.

24. The vehicular apparatus of claim 21, wherein the operations further include one or more operations of:

determining whether the attentiveness score meets a first set of criteria; and when the attentiveness score meets the first set of criteria, performing an action.

25. The vehicular apparatus of claim 24, wherein the processing system further comprises a wireless communications adaptor, and wherein performing the action comprises transmitting the attentiveness score through the wireless communications adaptor.

26. A method, comprising:

receiving first image data from a first camera oriented in a first direction with a first field of view facing a user operating a vehicle;

receiving second image data from a second camera oriented in a second direction different from the first direction, the second camera having a second field of view corresponding to a field of view of a surrounding of the vehicle;

determining a risk map based on the second image data, the risk map indicating a set of regions of interest within the field of view of the surrounding of the vehicle, the set of regions of interest comprising a first region of interest and a second region of interest;

determining a first gaze direction for the first region of interest and a second gaze direction for the second region of interest of the user based on the first image data;

determining a first correspondence between the first region of interest of the risk map and the first gaze direction;

determining a second correspondence between the second region of interest of the risk map and the second gaze direction;

determining a first attentiveness score based on the first correspondence between the first region of interest of the risk map and the first gaze direction, the first attentiveness score indicating whether the first gaze direction of the user corresponds to the first region of interest for at least a first threshold amount of time;

determining a second attentiveness score based on the second correspondence between the second region of interest of the risk map and the second gaze direction, the second attentiveness score indicating whether the second gaze direction of the user corresponds to the second region of interest for at least a second threshold amount of time, the second threshold amount of time being different from the first threshold amount of time; and controlling the vehicle based on the first and second attentiveness scores.

27. The method of claim 26, wherein the first attentiveness score is based on at least one of a total dwell time of the first gaze direction with respect to the first region of interest or a number of times the first gaze direction returns to the first region of interest.

28. The method of claim 26, wherein controlling the vehicle comprises generating an alert.

29. The method of claim 26, wherein controlling the vehicle comprises displaying a region of interest from the set of regions of interest on a heads-up display (HUD), the region of interest corresponding to a region of the risk map that is above a threshold risk level and uncorrelated with the gaze direction.

30. The method of claim 26, wherein determining the risk map comprises:

determining an object in the surrounding of the vehicle based on the second image data;

determining the object has appeared or disappeared within the first or second threshold amount of time; and determining a value for the risk map based on determining the object has appeared or disappeared within the first or second threshold amount of time.

* * * * *